United States Patent
Kim

(10) Patent No.: US 11,577,761 B2
(45) Date of Patent: Feb. 14, 2023

(54) VEHICLE CONTROL SYSTEM USING RELIABILITY OF INPUT SIGNAL FOR AUTONOMOUS VEHICLE

(71) Applicants: Hyundai Motor Company, Seoul (KR); Kia Motors Corporation, Seoul (KR)

(72) Inventor: In-Su Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 326 days.

(21) Appl. No.: 17/021,594

(22) Filed: Sep. 15, 2020

(65) Prior Publication Data
US 2022/0001899 A1   Jan. 6, 2022

(30) Foreign Application Priority Data
Jul. 2, 2020 (KR) .......................... 10-2020-0081343

(51) Int. Cl.
*B60W 60/00* (2020.01)
*B60W 40/04* (2006.01)

(52) U.S. Cl.
CPC ........ *B60W 60/0059* (2020.02); *B60W 40/04* (2013.01); *B60W 60/0053* (2020.02); *B60W 2554/4041* (2020.02)

(58) Field of Classification Search
CPC ............. B60W 60/0059; B60W 40/04; B60W 60/0053; B60W 2554/4041; B60W 2050/0215; B60W 50/0205; B60W 50/04; B60W 60/0015; B60W 30/08; B60W 40/08; B60W 40/105; B60W 2050/0043; B60W 2400/00; B60W 2552/53; B60W 2555/60; B60W 2720/10; B60Y 2300/08
See application file for complete search history.

(56) References Cited

U.S. PATENT DOCUMENTS 11,285,944 B2 *  3/2022  Hsu ................... B60W 50/0097
2021/0065544 A1 *  3/2021  Bai ....................... G08G 1/0112

FOREIGN PATENT DOCUMENTS

KR   2017-0040145 A   4/2017

* cited by examiner

*Primary Examiner* — Alan D Hutchinson
(74) *Attorney, Agent, or Firm* — Fox Rothschild LLP

(57) ABSTRACT

A vehicle control system uses reliability of an input signal of an autonomous vehicle to safely travel through an intersection or a crossroad. The system includes a first calculating unit that calculates reliability for behavior information of a front vehicle and a second calculating unit calculates reliability for state information of a traffic light in the crossroad or the intersection based on a surrounding vehicle. A third calculating unit calculates reliability for brake light information of the front vehicle and a fourth calculating unit calculates reliability for flow information of the surrounding vehicle passing the crossroad or the intersection. A determining unit generates a vehicle control signal according to the calculated reliability.

16 Claims, 7 Drawing Sheets

SECOND VEHICLE    TRAFFIC LIGHT

PRESENT VEHICLE    FIRST VEHICLE

THIRD VEHICLE

VEHICLE CONTROL SYSTEM USING RELIABILITY OF INPUT SIGNAL FOR AUTONOMOUS VEHICLE

CROSS-REFERENCE TO RELATED APPLICATIONS

This application claims priority under 35 U.S.C. § 119 to Korean Patent Application No. 10-2020-0081343, filed on Jul. 2, 2020, the disclosure of which is incorporated herein by reference in its entirety.

BACKGROUND

1. Field of the Disclosure

The present disclosure relates to a vehicle control system using reliability of an input signal of an autonomous vehicle, and more particularly, to a system for calculating reliability of various signals input to an autonomous vehicle and operating the autonomous vehicle to safely travel on an intersection or a crossroad based on satisfaction of reliability.

2. Description of the Related Art

An autonomous vehicle is a vehicle that may be driven automatically by recognizing surrounding conditions and vehicle conditions without the need to be operated by a driver to a predetermined destination. The autonomous vehicle is equipped with various types of sensors and a navigation device to travel according to a strategy in an order of surrounding environment recognition, determination, and vehicle control based on input information.

In particular, safe autonomous driving is unable to be performed if there is no reliability for various signals that the autonomous vehicle receives in a situation where a driver is not manipulating the vehicle. Particularly, when the autonomous vehicle travels through intersection or a crossroad in which a traffic light is installed, a dangerous situation of a collision accident between vehicles or the vehicle and a pedestrian may occur.

In the meantime, the related art, presents a method of operating an autonomous vehicle based on road traffic information in a lane when the autonomous vehicle travels in the lane, in which a sensing value that an image sensor obtains by sensing lane data of a lane is compared with preselected lane data to operate an autonomous vehicle.

However, in the related art, reliability of an image sensor is not considered and various input information is necessary for an autonomous vehicle to travel through intersection or a crossroad in which a traffic light is located, such that a safety accident is unable to be avoided with only the image sensor.

SUMMARY

The present disclosure provides a new form of disclosure which is capable of preventing a safety accident by calculating reliability of various information required for an autonomous vehicle to travel through intersection or a crossroad.

An exemplary embodiment of the present disclosure provides a system for operating a vehicle using reliability of an input signal of an autonomous vehicle, which calculates reliability of input signal information required for an autonomous vehicle to travel through a crossroad or an intersection and operates the vehicle, the system may include: a first calculating unit configured to calculate reliability for behavior information of a front vehicle; a second calculating unit configured to calculate reliability for state information of a traffic light located in the crossroad or the intersection based on existence of a surrounding vehicle; a third calculating unit configured to calculate reliability for brake light information of the front vehicle; a fourth calculating unit configured to calculate reliability for flow information of the surrounding vehicle passing through the crossroad or the intersection; and a determining unit configured to generate a vehicle control signal according to the reliability calculated by the first to fourth calculating units.

According to the present disclosure, reliability of various information input while an autonomous vehicle travels through an intersection or a crossroad according to an instruction of a traffic light may be calculated, thereby preventing a safety accident incurable in the intersection or crossroad.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
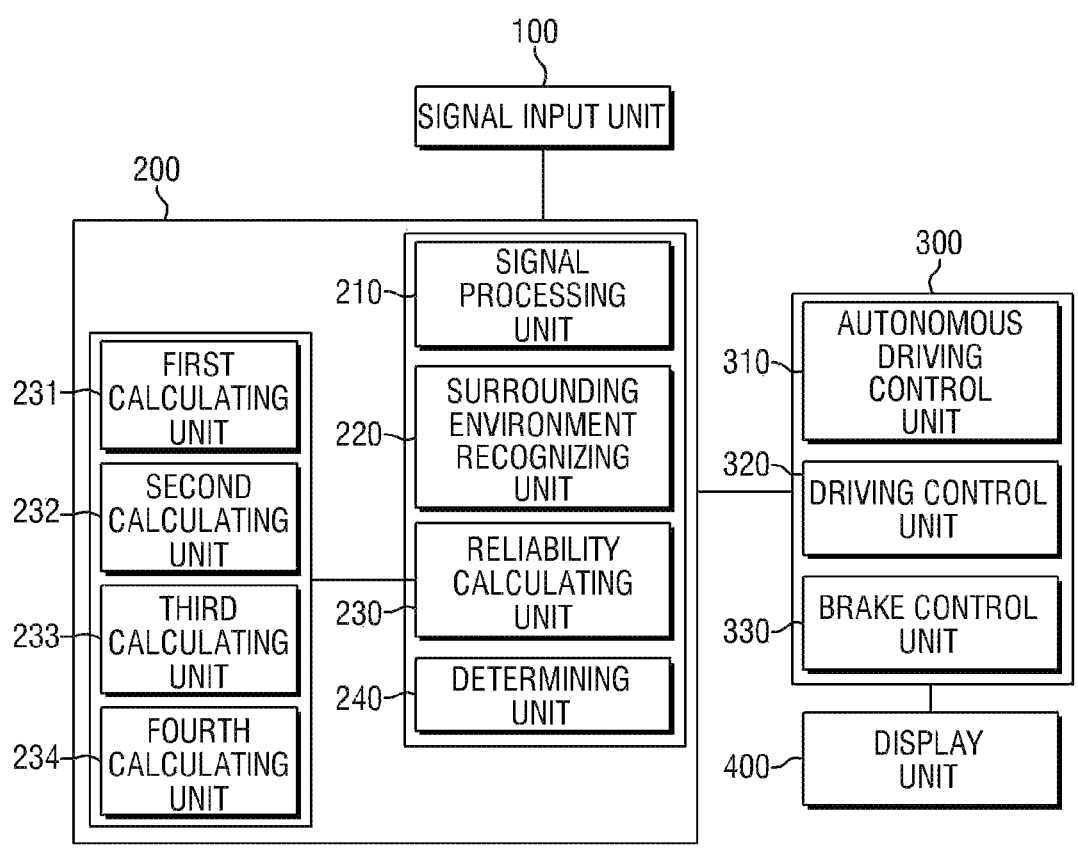
FIG. 1 is a diagram illustrating a schematic configuration of a vehicle control system using reliability of an input signal of an autonomous vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/controller refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of a vehicle control system using reliability of an input signal of an autonomous vehicle according to the present disclosure will be described in detail with reference to the drawings. Terms or words used below shall not be interpreted to be limited as general or lexical meanings, and on the principle that the inventor can appropriately define a concept of a term for describing the disclosure by the best method, the terms or the words shall be interpreted as a meaning and a concept corresponding to the technical spirit of the present disclosure.

FIG. 1 is a diagram illustrating a schematic configuration of a vehicle control system using reliability of an input signal of an autonomous vehicle according to an exemplary embodiment of the present disclosure. Referring to FIG. 1, a vehicle control system using reliability of an input signal of an autonomous vehicle according to an exemplary embodiment of the present disclosure may include a signal input unit 100, an estimating unit 200, a controller 300, and a display unit 400. The controller 300 may be configured to operate the other components of the system.

Particularly, the signal input unit 100 may be configured to collect various surrounding environment information input to a present vehicle. Herein, surrounding environment information is information regarding every environment of a surrounding area of the present vehicle, and may include map information, traffic information to a driving destination, optimal path information, road construction or traffic accident information, surrounding vehicle information, behavior information of a surrounding vehicle, traffic light state information, and the like. To obtain the surrounding environment information, the signal input unit 100 may include a vehicle sensor, such as a lidar, a radar, an ultrasonic sensor, and a camera, which is capable of sensing surrounding environment information from the present vehicle, and an Internet of Things (IoT) sensor establishing IoT communication and Vehicle To Everything (V2X) communication in which the present vehicle and a surrounding environment object are connected via a wireless network to communicate.

Figure 2:
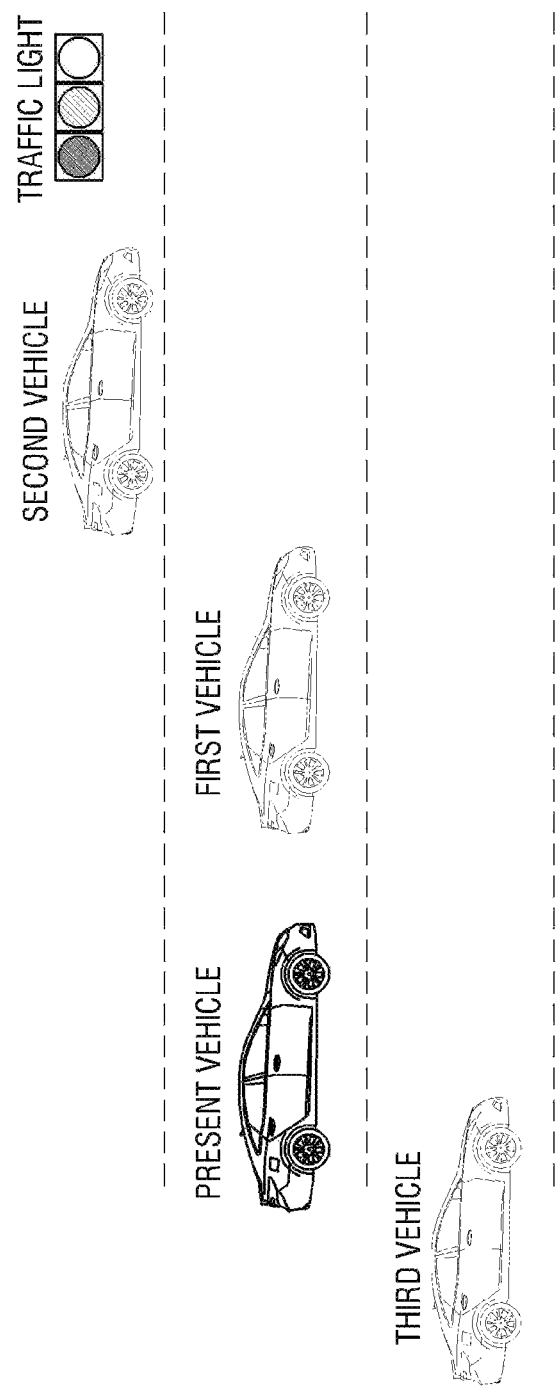
FIG. 2 is a diagram illustrating states of surrounding vehicles based on a present vehicle in an intersection or crossroad entrance section in which a traffic light is located according to an exemplary embodiment of the present disclosure.

FIG. 2 is a diagram illustrating states of surrounding vehicles based on a present vehicle in an intersection or crossroad entrance section in which a traffic light is located. Referring to FIG. 2, surrounding vehicles (e.g., a first vehicle, a second vehicle, and a third vehicle) may be located around the present or subject vehicle. The front vehicle (e.g., first vehicle) may be located in the same lane as the present vehicle, the surrounding vehicle (e.g., second vehicle) located in front of the present vehicle may be in a left lane among the side lanes of the present vehicle, and the surrounding vehicle (e.g., third vehicle) located behind the present vehicle may be in the right lane. Herein, the first vehicle may be located closer to the traffic light than the second vehicle.

The present vehicle may be configured to collect behavior information, lane information, traffic light state information, and the like of the surrounding vehicles (e.g., the first vehicle, the second vehicle, and the third vehicle) through the signal input unit 100. The estimating unit 200 may be configured to estimate whether signal information input to the vehicle has reliability and generate a control signal according to reliability, and may include a signal processing unit 210, a surrounding environment recognizing unit 220, a reliability calculating unit 230, and a determining unit 240.

The signal processing unit 210 may be configured to recognize surrounding phenomenon from the various information collected by the signal input unit 100 and extract object information, lane information, map information, and the like about the surrounding environment required for autonomous driving through a pre-processing process. The surrounding environment recognizing unit 220 may be configured to correct information required for autonomous driving using the information extracted by the signal processing unit 210 and recognize the surrounding environment according to the corrected information.

The reliability calculating unit 230 may be configured to calculate reliability of various signal information input to the present vehicle. However, in the present specification, the reliability calculating unit 230 may be configured to calculate reliability for behavior information of the front vehicle, signal traffic state information, brake light information of the front vehicle, and surrounding vehicle flow information which are the main signal information required for the present vehicle to travel an intersection or crossroad. The reliability calculating unit 230 may be configured to process various data at an event occurring time at which various signal information is required and calculate reliability. The reliability calculating unit 230 may include first to fourth calculating units 231, 232, 233, and 234.

Figure 3:
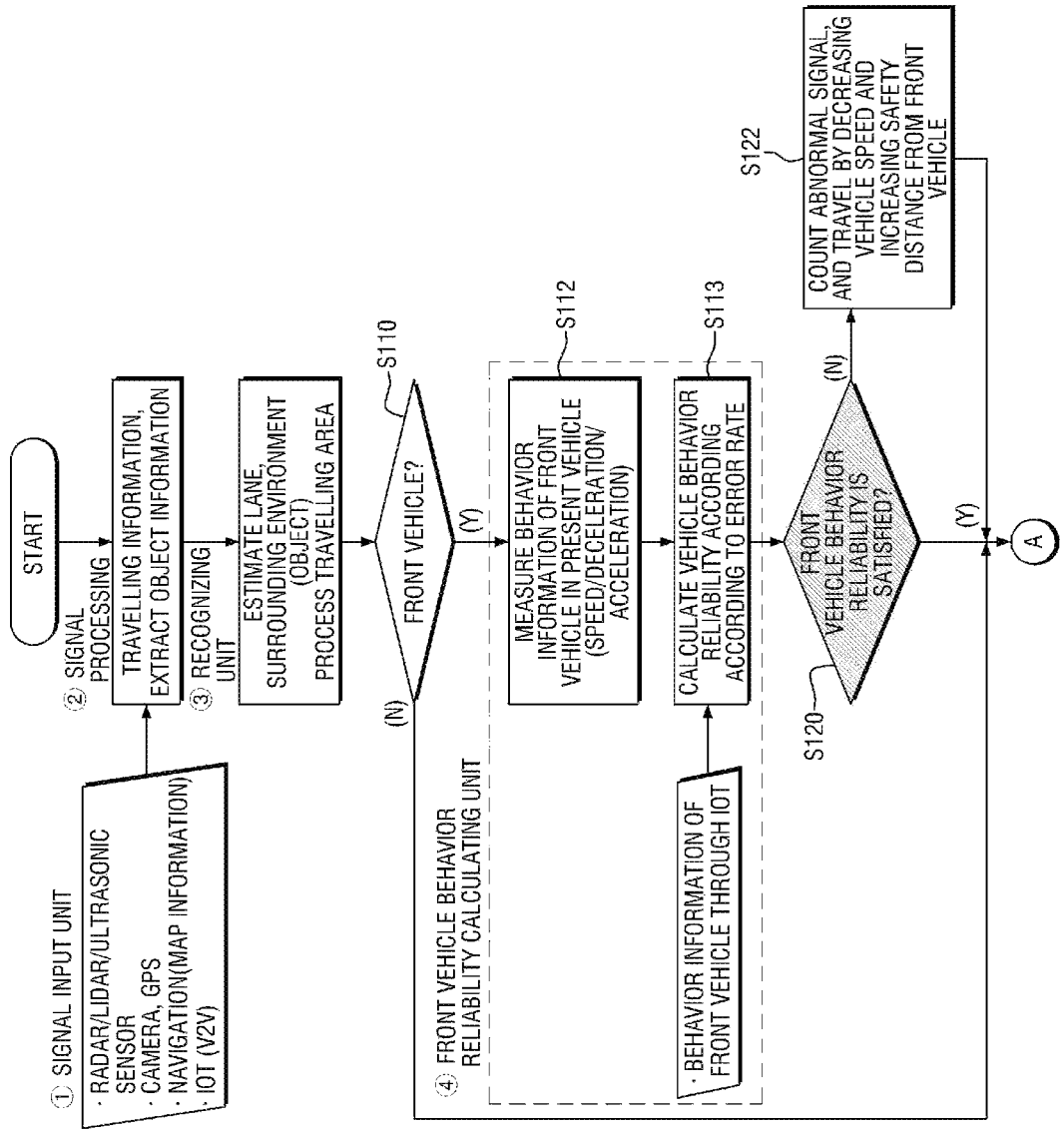
FIG. 3 is a diagram illustrating a calculation process of a first calculating unit according to the exemplary embodiment of the present disclosure.

FIG. 3 is a diagram illustrating a calculation process of the first calculating unit according to the exemplary embodiment of the present disclosure. First, the first calculating unit 231 may be configured to determine whether there is a front vehicle (S110). In response to detecting the front vehicle, the first calculating unit 231 may be configured to analyze behavior information of the front vehicle (S112) and calculate reliability for the behavior information of the front vehicle (S113). Herein, the behavior information of the front vehicle is the information regarding deceleration, acceleration, and a speed of the front vehicle, and the like. According to the illustration of FIG. 2, the present vehicle may collect the behavior information of the first vehicle.

The first calculating unit 231 may be configured to compare a sensing value obtained by sensing the behavior information of the front vehicle using the vehicle sensor in the present vehicle with a reception value which the present vehicle receives for the behavior information of the front vehicle from the front vehicle using the IoT sensor. Herein, the first calculating unit 231 may be configured to compare a difference between the sensing value and the reception value with a preset reference error value and calculate reliability. In response to determining that the difference between the sensing value and the reception value is less than the reference error value, the first calculating unit 231 may be configured to calculate that the reliability of the behavior information of the front vehicle is satisfied (S120).

In contrast to this, in response to determining that the difference between the sensing value and the reception value is greater than the reference error value, the first calculating unit 231 may be configured to calculate that the reliability of the behavior information of the front vehicle is not satisfied and count the behavior information of the front vehicle as an abnormal signal (S122). An abnormal signal counting value may increase according to the number of times of the calculation by the first calculating unit 231.

Figure 4:
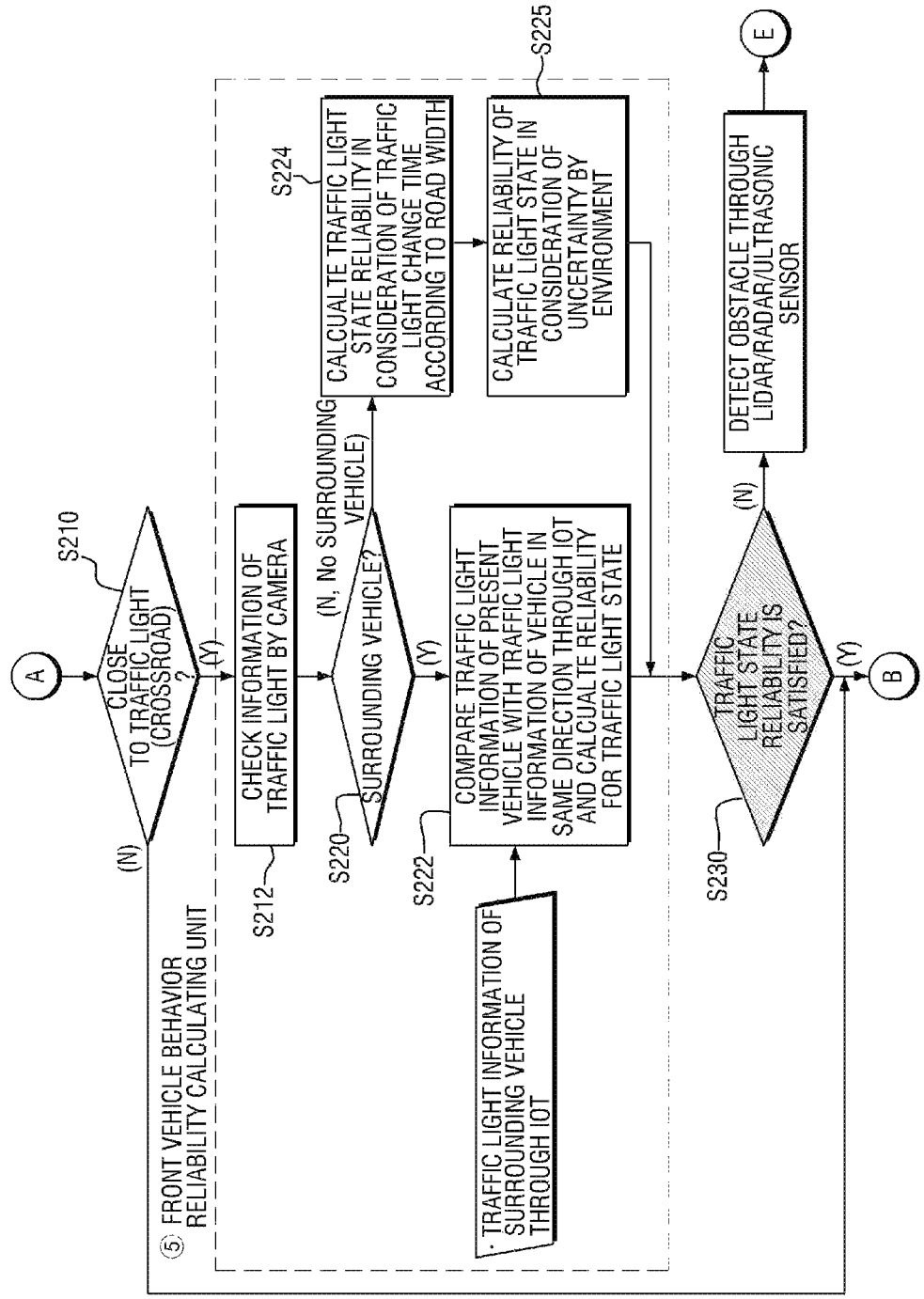
FIG. 4 is a diagram illustrating a calculation process of a second calculating unit according to the exemplary embodiment of the present disclosure.

FIG. 4 is a diagram illustrating a calculation process of the second calculating unit according to the exemplary embodiment of the present disclosure. The second calculating unit 232 may be configured to determine whether the present vehicle is close to the intersection or crossroad (S210). The second calculating unit 232 may be configured to check state information of the traffic light using the vehicle sensor (S212). The state information of the traffic light is highly related to a safety accident of a vehicle or a pedestrian, and thus, the calculation of reliability is significant. The vehicle sensor may have low reliability due to performance of the sensor itself and the surrounding environment. Accordingly, in the exemplary embodiment of the present disclosure, input information by the IoT sensor is further considered.

In the meantime, the second calculating unit 232 may be configured to divide the case into the case where there is a surrounding vehicle and the case where there is no surrounding vehicle based on the present vehicle and calculate reliability for the state information of the traffic light (S220). When a surrounding vehicle is present, the second calculating unit 232 may be configured to compare a sensing value obtained by sensing the state information of the traffic light using the camera and the like in the present vehicle and a reception value which the present vehicle receives for the state information of the traffic light from the surrounding vehicle using the IoT sensor (S222).

In particular, the second calculating unit 232 may be configured to assign weighted value to the reception value received from the surrounding vehicle according to a distance between the traffic light and the surrounding vehicle and calculate the reliability. In other words, the second calculating unit 232 may be configured to assign a large weighted value to the reception value received from the surrounding vehicle located to be close to the traffic light and assign a small weighted value to the reception value received from the surrounding vehicle located to be far from the traffic light. According to the illustration of FIG. 2, the distance between the second vehicle and the traffic light is smallest, and thus, a large weighted value may be assigned to the reception value which the present vehicle receives from the second vehicle.

In the exemplary embodiment of the present disclosure, a formula for calculating the reception value for the state information of the traffic light using the IoT sensor is as follows.

Calculation Formulae:

Formula 1

Reception value for green state information of traffic light by using $IoT$ sensor $= \sum a_1 \times \frac{1}{D_1} \times C_1$ Formula 2

Reception value for yellow state information of traffic light by using $IoT$ sensor $= \sum a_2 \times \frac{1}{D_2} \times C_2$ Formula 3

Reception value for red state information of traffic light by using $IoT$ sensor $= \sum a_3 \times \frac{1}{D_3} \times C_3$ Formula 4

Reception value for state information of traffic light by using $IoT$ sensor $= \max(\text{Formula 1, Formula 2, Formula 3})$ wherein, $\alpha_1\alpha_1$, $\alpha_2\alpha_2$, and $\alpha_3\alpha_3$ mean weighted values, $D_1D_1$, $D_2D_2$, and $D_3D_3$ means distances between the surrounding vehicles and the traffic light, and $C_1C_1$, $C_2C_2$, and $C_3C_3$ means the number of surrounding vehicles within a predetermined distance from the present vehicle.

In the calculation formulae, the value obtained by the calculation of Formula 1 is the value received from the surrounding vehicle through the IoT sensor of the present vehicle for the information regarding the determination that the color of the traffic light is green, and is the value drawn by differently assigning the weighted value according to the distance between the traffic light and the surrounding vehicle and summing the number of surrounding vehicles. Similarly, the values calculated by Formula 2 and Formula 3 are the values received from the surrounding vehicle through the IoT sensor for the information on the determination that the colors of the traffic light is yellow and red, respectively, and may be drawn in the same manner as that of the foregoing process. Formula 4 determines the largest value among the values of Formula 1 to Formula 3 as the reception value for the state information of the traffic light using the IoT sensor.

In the meantime, when no surrounding vehicle is present, the present disclosure is unable to receive the state information of the traffic light from the surrounding vehicle. In particular, in the exemplary embodiment of the present disclosure, the second calculating unit 232 may be configured to compare a preset operation time of the traffic light with an operation time of the traffic light measured by the vehicle sensor of the present vehicle and calculate reliability for the state information of the traffic light (S224). Herein, the operation time of the traffic light refers to the time when the color of the traffic light changes. In general, an operation time of the traffic light is different according to a road width, and as the road is wider, the operation time of the traffic light is increases. For example, when an operation time of a traffic light installed on a road having a two-lane road width is preset to 2 minutes, when the operation time of the traffic light sensed by the present vehicle is 3 minutes, the state information of the traffic light is unreliable.

In the meantime, when the surrounding environment in which the traffic light is located is changed, the state information of the traffic light sensed by the camera and the like are unreliable. Therefore, according to another exemplary embodiment of the present disclosure, when no surrounding vehicle is detected, a preliminary test may be performed in the surrounding environment in which reliability is low, and thus, when the present vehicle determines that the surrounding environment is the same as the surrounding environment in which the preliminary test was performed during the travelling, the state information of the traffic light may be calculated to be unreliable (S225). When the sensing value matches the reception value or the preset operation time of the traffic light matches the operation time of the traffic light sensed by the present vehicle, the second calculating unit 232 may be configured to calculate that the reliability for the state information of the traffic light is satisfied (S230).

Figure 5:
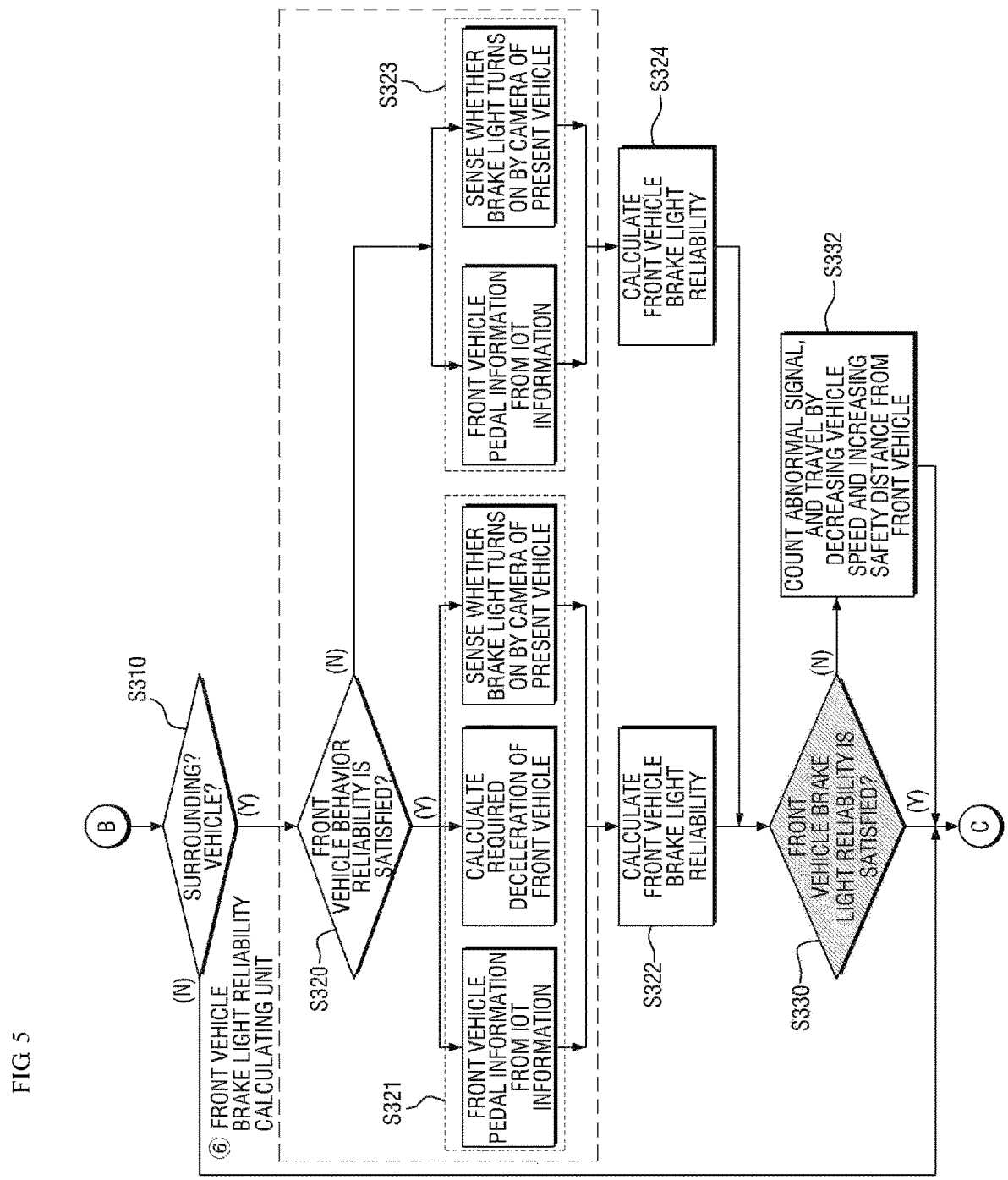
FIG. 5 is a diagram illustrating a calculation process of a third calculating unit according to the exemplary embodiment of the present disclosure.

FIG. 5 is a diagram illustrating a calculation process of the third calculating unit according to the exemplary embodiment of the present disclosure. The third calculating unit 233 may be configured to determine whether there is a front vehicle (S310). In response to detecting a front vehicle, the third calculating unit 233 may be configured to calculate reliability for information regarding a brake light of the front vehicle. Herein, the reliability for information regarding a brake light of the front vehicle may be calculated differently based on satisfaction of the reliability for behavior information of the front vehicle (S320). When a deceleration size by the braking is equal to or greater than a predetermined value, the brake light may be turned on, but if the brake light is not turned on even when the required deceleration size of the front vehicle is equal to or greater than the predetermined value, the reliability for the information on the brake light of the front vehicle may not be satisfied.

When the reliability for the behavior information of the front vehicle is satisfied, the third calculating unit 233 may be configured to compare the sensing value obtained by sensing the brake light of the front vehicle using the camera and the like in the present vehicle and the sensing value obtained by sensing a required deceleration of the front vehicle using the radar, the lidar, the ultrasonic sensor, and the like in the present vehicle with the reception value which the present vehicle receives for a pedal manipulation signal from the front vehicle using the IoT sensor (S321), and calculate reliability according to the match between the sensing values and the reception value (S322).

When the sensing values match the reception value, the third calculating unit 233 may be configured to calculate that the reliability for the state information of the brake light of the front vehicle is satisfied (S330). In contrast to this, when the sensing values do not match the reception value, the third calculating unit 233 may be configured to calculate that the reliability for the state information of the brake light of the front vehicle is not satisfied and count the state information for the brake light of the front vehicle as an abnormal signal (S332). An abnormal signal counting value may increase according to the number of times of the calculation by the third calculating unit 233.

In the meantime, when the reliability for the behavior information of the front vehicle is not satisfied, the sensing value obtained by sensing the required deceleration of the front vehicle among the sensing values cannot be considered, and thus, the third calculating unit 233 may be configured to compare the sensing value obtained by sensing the brake light of the front vehicle using the camera and the like in the present vehicle with the reception value which the present vehicle receives for the pedal manipulation signal using the IoT sensor from the front vehicle (S323), and calculate reliability according to the matching of the sensing value and the reception value (S324).

Figure 6:
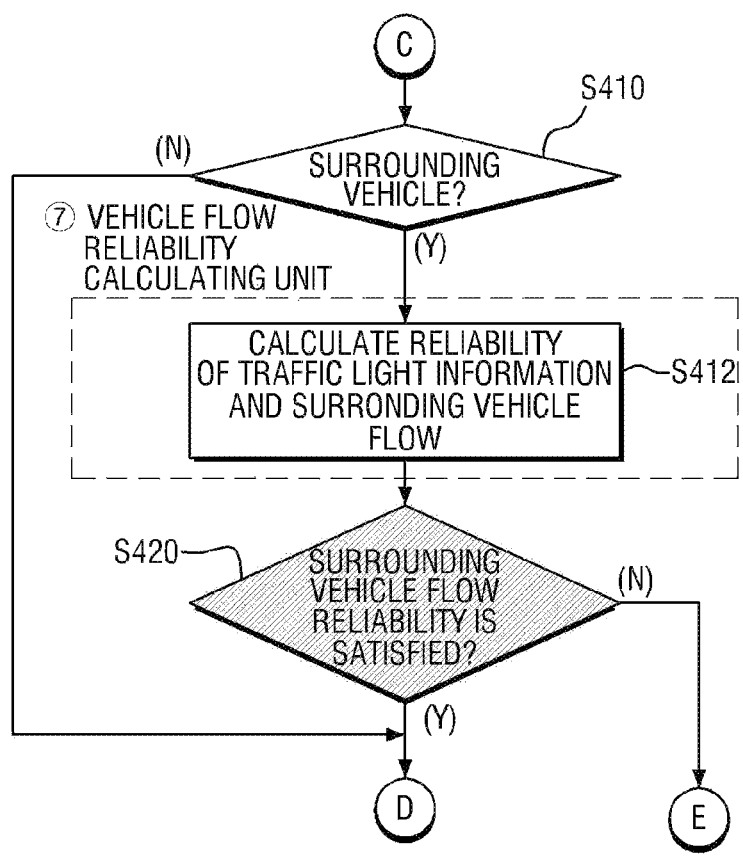
FIG. 6 is a diagram illustrating a calculation process of a fourth calculating unit according to the exemplary embodiment of the present disclosure.

FIG. 6 is a diagram illustrating a calculation process of the fourth calculating unit according to the exemplary embodiment of the present disclosure. The fourth calculating unit 234 may be configured to determine whether there is a surrounding vehicle in the vicinity of the intersection or crossroad. In response to detecting a surrounding vehicle, the fourth calculating unit 234 may be configured to calculate reliability for flow information about the surrounding vehicle (S412). There is a case where the surrounding vehicles is unable to travel because there is a pedestrian and the like in the intersection or crossroad despite of the green traffic light according to the state information of the traffic light.

In this case, the present vehicle is unable to accurately determine the front situation, so that it is necessary to calculate reliability for the flow information about the surrounding vehicle. In other words, the calculation of the reliability for the flow information regarding the surrounding vehicle includes determining whether the various information, such as the state information of the traffic light, the deceleration information of the surrounding vehicle, and information whether there is a pedestrian and the like in the intersection or crossroad matches the flow information of the surrounding vehicle. In response to determining that the various information matches the flow information of the surrounding vehicle, the fourth calculating unit 234 may be configured to calculate the reliability of the flow information of the surrounding vehicle is satisfied (S420).

Figure 7:
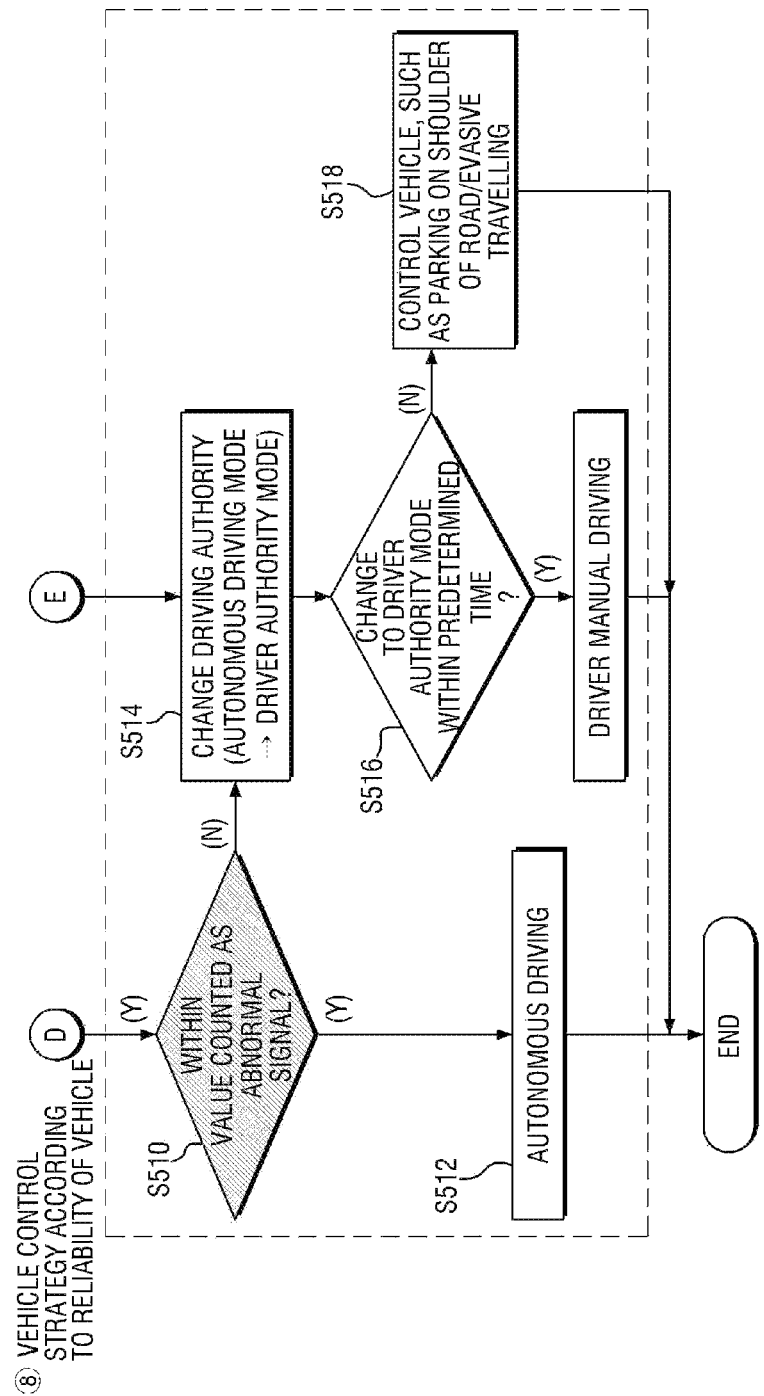
FIG. 7 is a diagram illustrating an operation process of a determining unit according to the exemplary embodiment of the present disclosure.

FIG. 7 is a diagram illustrating an operation process of the determining unit according to the exemplary embodiment of the present disclosure. In the meantime, the operation process of the determining unit 240 will be described with reference to FIGS. 3 to 7. The determining unit 240 may be configured to generate a signal for operating the vehicle according to the reliability calculated by the first to fourth calculating units 231, 232, 233, and 234. In response to determining that all of the reliability calculated by the first to fourth calculating units 231, 232, 233, and 234 are satisfied, the determining unit 240 may be configured to operate the vehicle to continuously travel in an autonomous driving mode (S512).

Referring to FIG. 3, when the reliability of the behavior information of the front vehicle or the brake light information of the front vehicle is not satisfied, the determining unit 240 may be configured to generate a control signal to decrease a vehicle speed and maintain a safety distance with the front vehicle (S122). Referring to FIGS. 3, 5, and 7, the determining unit 240 may be configured to compare a value counted as an abnormal signal generated when the reliability of the behavior information of the front vehicle or the brake light information of the front vehicle is not satisfied with a reference counting value (S512).

In response to determining that the value counted as the abnormal signal is less than the reference counting value, the determining unit 240 may be configured to operate the vehicle to continuously travel in the autonomous driving mode. In contrast to this, in response to determining that the value counted as the abnormal signal is greater than the reference counting value, the determining unit 240 may be configured to generate the control signal to shift the vehicle mode from the autonomous driving mode to a driver authority mode or for the vehicle to evasively travel. In the meantime, when the mode is not shifted within a predetermined time (S516) after the determining unit 240 operates the vehicle mode to be shifted to the driver authority mode (S514), the determining unit 240 may be configured to determine that the situation is an emergency situation and also operate the vehicle to evasively travel (S518).

Referring to FIGS. 4, 6, and 7, when the reliability for the state information of the traffic light or the flow information of the surrounding vehicle is not satisfied, the determining unit 240 may be configured to generate the control signal to shift the vehicle mode from the autonomous driving mode to the driver authority mode or for the vehicle to evasively travel. In the meantime, when the mode is not shifted within a predetermined time (S516) after the determining unit 240 operates the vehicle mode to be shifted to the driver authority mode (S514), the determining unit 240 may be configured to determine that the situation is an emergency situation and operate the vehicle to evasively travel (S518).

Referring back to FIG. 1, the controller 300 may include an autonomous driving controller 310, a driving controller 320, and a brake controller 330, and may be configured to receive the control signal of the determining unit 240 and execute each configuration connected to the controller 300. The autonomous driving controller 310 may be configured to recognize the surrounding environment by detecting and processing external information by the signal input unit 100 while travelling even though a driver does not control a brake, a steering wheel, an acceleration pedal, and the like to autonomously determine a travelling path. The driving controller 320 may be connected with a motor and may be configured to operate the autonomous vehicle to travel or perform regenerative braking. The brake controller 330 may be configured to operate a main brake to generate braking hydraulic pressure according to the autonomous driving controller 310 or a demand of the driver. The display unit 400 may be configured to display the control signal generated by the determining unit 240, and display a travelling path, guidance for shifting the vehicle mode to the driver authority mode, and the like.

While this disclosure has been described in connection with the limited exemplary embodiments and drawings, the disclosure is not limited thereto, and it is obvious that various changes and modifications within the technical spirit of the present disclosure and the scope equivalent to the scope of the appended claims may be made by those skilled in the art.

What is claimed is:

1. A system for operating a vehicle using reliability of an input signal of an autonomous vehicle, which calculates reliability of input signal information required for an autonomous vehicle to travel through a crossroad or an intersection and operates the vehicle, the system comprising:
   a first calculating unit configured to calculate reliability for behavior information of a front vehicle;
   a second calculating unit configured to calculate reliability for state information of a traffic light located in the crossroad or the intersection based on existence of a surrounding vehicle;
   a third calculating unit configured to calculate reliability for brake light information of the front vehicle;
   a fourth calculating unit configured to calculate reliability for flow information of the surrounding vehicle passing the crossroad or the intersection; and
   a determining unit configured to generate a vehicle control signal according to the reliability calculated by the first to fourth calculating units.

2. The system of claim 1, wherein the first calculating unit is configured to calculate the reliability according to a difference between a sensing value obtained by sensing a behavior of the front vehicle in a present vehicle and a reception value which the present vehicle receives for the behavior of the front vehicle through Internet of Things (IoT).

3. The system of claim 2, wherein in response to determining that the difference between the sensing value and the reception value is greater than a reference error value, the behavior information of the front vehicle is counted as the abnormal signal.

4. The system of claim 3, wherein in response to determining that the value counted as the abnormal signal is greater than a first preset counting value, the determining unit is configured to generate a control signal for the present vehicle to evasively travel or to shift a vehicle mode to a driver authority mode.

5. The system of claim 2, wherein in response to determining that the difference between the sensing value and the reception value is greater than a reference error value, the first calculating unit is configured to calculate that the reliability for the behavior information of the front vehicle is not satisfied, and the determining unit is configured to generate a control signal to decrease a vehicle speed of the present vehicle.

6. The system of claim 1, wherein the second calculating unit is configured to calculate the reliability according to a difference between a sensing value obtained by sensing the state information of the traffic light in a present vehicle and a reception value which the present vehicle receives for state information of the traffic light sensed by the surrounding vehicle using the IoT.

7. The system of claim 6, wherein the second calculating unit is configured to assign a weighted value to the reception value according to locations of the traffic light and the surrounding vehicle among the reception values.

8. The system of claim 1, wherein in response to determining that there is no surrounding vehicle, the second calculating unit is configured to calculate the reliability by comparing a preset operation time of the traffic light according to a road width and an operation time of the traffic light sensed by the present vehicle.

9. The system of claim 1, wherein in response to calculating that the reliability for the state information of the traffic light is not satisfied, the determining unit is configured to generate a control signal for the present vehicle to evasively travel or to shift a vehicle mode to a driver authority mode.

10. The system of claim 1, wherein the third calculating unit is configured to calculate the reliability by comparing a sensing value obtained by sensing a brake light of the front vehicle in a present vehicle and a reception value which the present vehicle receives for a pedal manipulation signal of the front vehicle by using IoT.

11. The system of claim 10, wherein in response to determining that the reliability for the behavior information of the front vehicle is satisfied, the third calculating unit is configured to consider a required deceleration sensing value of the front vehicle sensed by the present vehicle.

12. The system of claim 11, wherein in response to determining that the sensing value is different from the reception value, the brake light information of the front vehicle is counted as an abnormal signal.

13. The system of claim 11, wherein in response to determining that the sensing value is different from the reception value, the determining unit is configured to generate a control signal to decrease a speed of the present vehicle.

14. The system of claim 12, wherein in response to determining that the value counted as the abnormal signal is greater than a second preset counting value, the determining unit is configured to generate a control signal for the present vehicle to evasively travel or to shift a vehicle mode to a driver authority mode.

15. The system of claim 1, wherein the fourth calculating unit is configured to calculate the reliability for the flow information of the surrounding vehicle by comparing the state information of the traffic light and the behavior information of the surrounding vehicle.

16. The system of claim 1, wherein in response to determining that the reliability for the flow information of the surrounding vehicle is not satisfied, the determining unit is configured to generate a control signal for the present vehicle to evasively travel or to shift a vehicle mode to a driver authority mode.

\* \* \* \* \*